US012335227B2

(12) United States Patent
Ban et al.

(10) Patent No.: US 12,335,227 B2
(45) Date of Patent: Jun. 17, 2025

(54) CONNECTIVITY BETWEEN CLOUD AND ON-PREMISES SYSTEMS

(71) Applicant: SAP SE, Walldorf (DE)

(72) Inventors: Rui Ban, Xi'an (CN); Yucheng Guo, Xi'an (CN); Jing-Tao Li, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/144,699

(22) Filed: May 8, 2023

(65) Prior Publication Data

US 2024/0380726 A1    Nov. 14, 2024

(51) Int. Cl.
*H04L 61/5007* (2022.01)
*H04L 61/2503* (2022.01)
*H04L 67/1001* (2022.01)
*H04L 101/663* (2022.01)

(52) U.S. Cl.
CPC ...... *H04L 61/5007* (2022.05); *H04L 61/2503* (2013.01); *H04L 67/1001* (2022.05); *H04L 2101/663* (2022.05)

(58) Field of Classification Search
CPC ............ H04L 61/5007; H04L 61/2503; H04L 67/1001; H04L 2101/663; H04L 101/663; H04L 61/2514
See application file for complete search history.

(56) References Cited

U.S. PATENT DOCUMENTS

| | | | |
|---|---|---|---|
| 11,792,153 B1 * | 10/2023 | Pamu .................. | H04L 61/2514 370/392 |
| 2015/0101021 A1 * | 4/2015 | Mc Erlean ............ | G06F 16/275 707/625 |
| 2018/0351970 A1 * | 12/2018 | Majumder ............ | H04L 63/061 |
| 2019/0235903 A1 * | 8/2019 | Singh .................. | G06F 9/45558 |
| 2022/0210005 A1 * | 6/2022 | Keane ................. | H04L 41/0663 |
| 2023/0083582 A1 * | 3/2023 | Parla ................... | H04L 12/4641 709/203 |
| 2023/0085513 A1 * | 3/2023 | Mestery .............. | H04L 67/1012 709/219 |
| 2023/0133380 A1 * | 5/2023 | Kreger-Stickles ...... | H04L 41/08 709/220 |
| 2023/0138372 A1 * | 5/2023 | Kreger-Stickles .... | H04L 63/164 709/220 |
| 2023/0164113 A1 * | 5/2023 | Gupta ................. | H04L 61/5061 709/245 |

* cited by examiner

*Primary Examiner* — Tonia L Dollinger
*Assistant Examiner* — Mehulkumar J Shah
(74) *Attorney, Agent, or Firm* — SCHWEGMAN LUNDBERG & WOESSNER, P.A.

(57) ABSTRACT

Techniques for providing connectivity between cloud and on-premises systems are disclosed. A computer system may receive, by a node of a virtual private cloud from a software application running on the virtual private cloud, a virtual host identification of a destination host running on an on-premises network, and identify, by the node, a virtual Internet Protocol (IP) address of the destination host based on the virtual host identification. Then, the computer system may send, by the node, a request comprising the virtual IP address of the destination host to a software agent running on the on-premises network, where the software agent is configured to send the request to the destination host using the virtual IP address.

18 Claims, 7 Drawing Sheets

| DESTINATION HOST | VIRTUAL HOST | VIRTUAL IP ADDRESS |
|---|---|---|
| HOST1.INTERNAL | HOST1.VIRTUAL | 192.168.32.11 |
| HOST2.INTERNAL | HOST2.VIRTUAL | 192.168.32.21 |
| . . . | . . . | . . . |

CONNECTIVITY BETWEEN CLOUD AND ON-PREMISES SYSTEMS

BACKGROUND

On-premises software is installed and runs on computers that are on the premises of the person or organization using the software. In contrast, cloud software is hosted on a vendor's server, and the hosted services are delivered over the Internet, such that the hosted services are accessed by users via a web browser.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems of providing connectivity between cloud and on-premises systems are disclosed. In the following description, for purposes of explanation, numerous specific details are set forth in order to provide a thorough understanding of example embodiments. It will be evident, however, to one skilled in the art that the present embodiments can be practiced without these specific details.

Services, such as data integration, data management, and data analysis, may be provided by cloud-based systems. However, on-premises systems remain widely used in users' production environments. The resources within these on-premises systems are not directly accessible from the cloud-based systems. There are technical challenges in providing secure connectivity between cloud services and on-premises systems without compromising the on-premises systems. Certain cloud-based services are designed for data intensive workloads that are heavily dependent on stable and high-performance connectivity. Some solutions for connecting a cloud system to an on-premises system involve using a reverse proxy that relies on secure Transmission Control Protocol (TCP) channel. The reverse proxy may be integrated into software products to establish a secure connection between cloud and on-premises systems. However, several technical problems arise when using these reverse proxies.

One technical problem is that certain connection types may not be supported by a reverse proxy for certain software applications. Although a customized integration between the concerned application and the reverse proxy may be used to address this problem, implementing such a customized integration is a complicated task that consumes significant resources to complete and takes too long to meet user needs. Another technical problem is that the connection formed using current reverse proxies is unstable. On-premises data sources are widely used as sources or destinations in long-running production data pipelines. However, customers can hardly keep their pipelines running for a week without failures because of unreliable connections. The root cause of these connection failures is that the reverse proxy relies on an underlying stateful TCP connection to establish the cloud to on-premises connection channel, which is fragile, especially in a cloud environment. Furthermore, the connection performance when using current reverse proxies is poor, as current reverse proxies only wield a limited number of underlaying TCP connections, failing to make full use of the network bandwidth. This issue is critical for large-scale data replication provided by cloud services. Other technical challenges may arise as well.

The implementation of the features disclosed herein involves a non-generic, unconventional, and non-routine operation or combination of operations. By applying one or more of the solutions disclosed herein, some technical effects of the system and method of the present disclosure are to provide a secure, robust, and high-performance cloud to on-premises connectivity solution for cloud services by using an underlying stateless connection and routing based on virtual Internet Protocol (IP) addresses. In some example embodiments, a node of a virtual private cloud receives a virtual host identification of a destination host running on an on-premises network from a software application running on the virtual private cloud. The node may identify a virtual IP address of the destination host based on the virtual host identification, and then send a request comprising the virtual IP address of the destination host to a software agent running on the on-premises network. The software agent may be configured to use the virtual IP address to send the request to the destination host that corresponds to the virtual IP address, such as by accessing a mapping of virtual IP addresses to physical internal IP addresses to determine the physical internal IP address of the destination host and then sending the request to the physical internal IP address of the destination host.

By implementing a network communication technique that involves using a virtual IP address to hide the location of an on-premises destination host from a cloud-based software application attempting to communicate with the on-premises destination host, the features of the present disclosure provide secure communication between the cloud-based software application and the on-premises destination host. Furthermore, in some example embodiments, the features of the present disclosure include using a stateful connection between the virtual private cloud and the on-premises network using a Quick User Datagram Protocol (UDP) Internet Connection (QUIC) protocol, thereby providing a stable, reliable, resilient, and high-performance connection between the virtual private cloud and the on-premises network. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
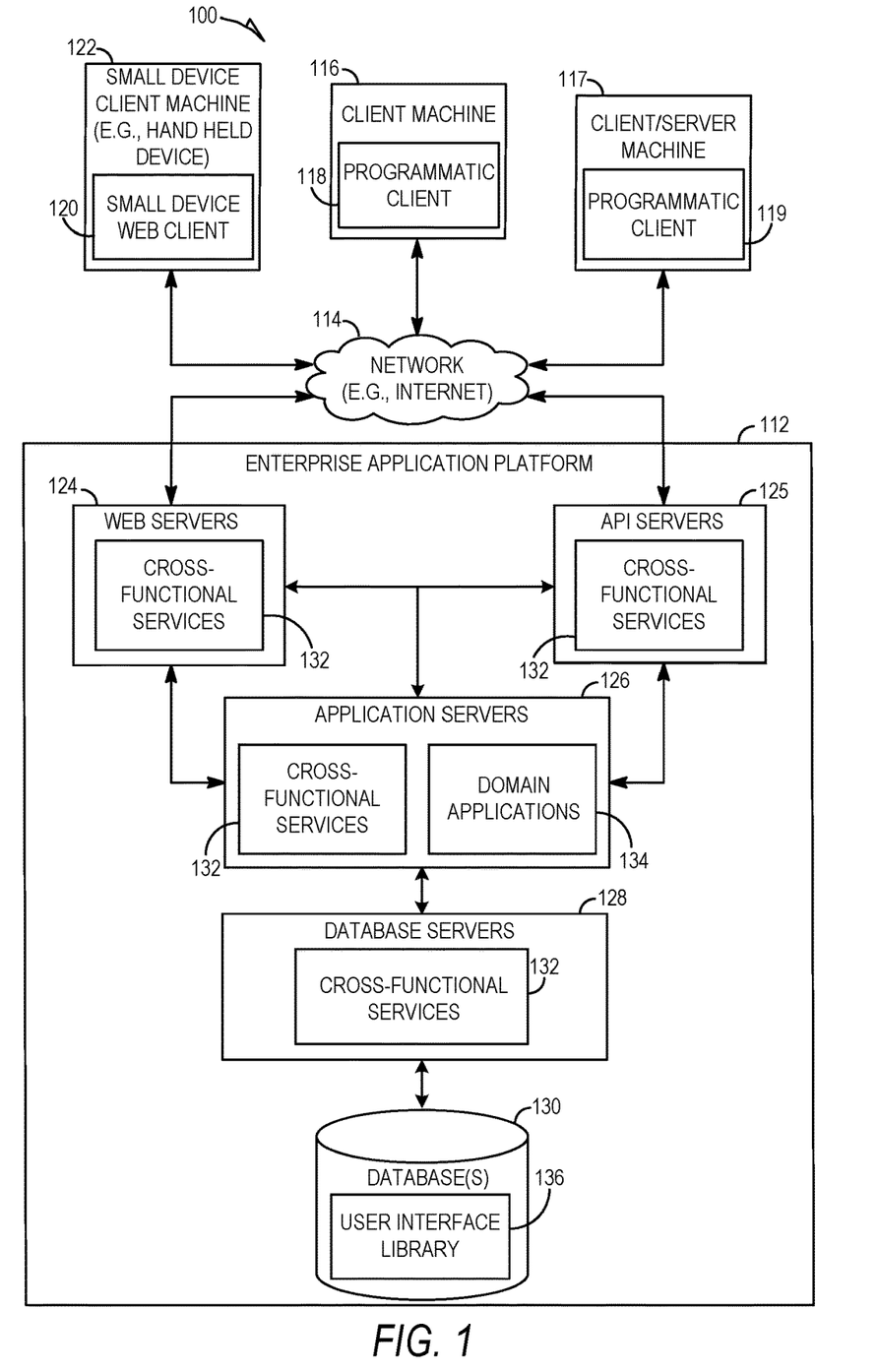
FIG. 1 is an example network diagram illustrating a system.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
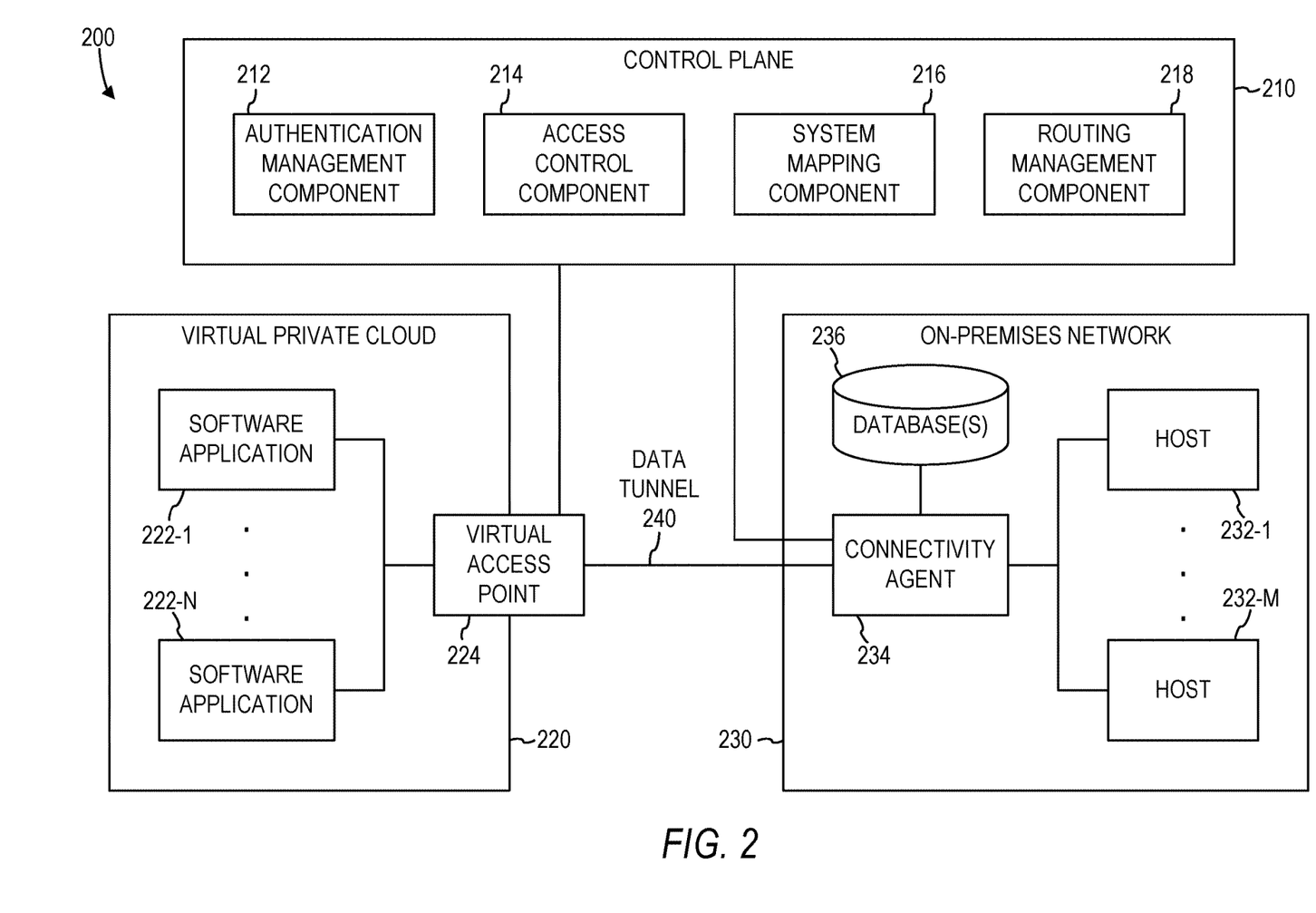
FIG. 2 is a block diagram illustrating an example system architecture for providing connectivity between cloud and on-premises systems.

FIG. 2 is a block diagram illustrating an example system architecture 200 for providing connectivity between cloud and on-premises systems. In some example embodiments, the system architecture 200 may comprise a control plane 210, a virtual private cloud 220, and an on-premises network 230. The control plane 210 and the virtual private cloud 220 may be implemented by the enterprise application platform 112 of FIG. 1, such as by being incorporated into the application server(s) 126, whereas the on-premises network 230 may reside in a computer system that is external to the enterprise application platform 112. The control plane 210 and the virtual private cloud 220 may communicate with the on-premises network 230 via the network 114. However, the control plane 210, the virtual private cloud 220, and the on-premises network 230 may be implemented in other ways as well.

In some example embodiments, the virtual private cloud 220 comprises an on-demand configurable pool of shared resources allocated within a public cloud environment. The virtual private cloud 220 may provide isolation between the different organizations using the resources. The virtual private cloud 220 may be implemented as a division of a service provider's public cloud multi-tenant architecture, thereby providing a private cloud hosted within a public cloud architecture. The virtual private cloud 220 may host a plurality of software applications 222 (e.g., software application 222-1 to software application 222-N in FIG. 2) running on the virtual private cloud 220. The software applications 222 may comprise cloud-based software applications that may be accessed by a computing device of a user via a web browser on the computing device communicating with the software application 222 via an Internet connection.

The virtual private cloud 220 may comprise a virtual access point 224. The virtual access point 224 comprises a network node of the virtual private cloud 220. In some example embodiments, the virtual access point 224 comprises a gateway of the virtual private cloud 220. A gateway is a piece of networking hardware or software used in telecommunications networks that allows data to flow from one discrete network to another. For example, the virtual access point 224 may be configured to control connection and communication between the software applications 222 of the virtual private cloud 220 and one or more components of the on-premises network 230.

The on-premises network 230 may comprise a plurality of hosts 232 (e.g., host 232-1 to host 232-M in FIG. 2). Each host 232 may comprise a computer or other device connected to the on-premises network 230. Each host 232 may work as a server offering information resources, services, or applications to users or other hosts 232 on the on-premises network 230. Each host 232 may be assigned a network address, such as an identifier for the host 232 that is configured to be a unique identifier across the on-premises network 230.

The on-premises network 230 may comprise a connectivity agent 234. In some example embodiments, the connectivity agent 234 comprises a software agent that is configured to control connection and communication between the hosts 232 of the on-premises network 230 and the software applications 222 of the virtual private cloud 220. A software agent is a computer program that performs actions continuously and autonomously on behalf of another program in a relationship of agency. For example, the connectivity agent 234 may perform actions in a relationship of agency with the virtual access point 224 of the virtual private cloud 220.

In some example embodiments, the system architecture 200 implements a virtual zone that comprises the virtual access point 224 of the virtual private cloud 220 and control plane 210, as well as the connectivity agent 234 of the on-premises network 230. The virtual access point 224 may serve as the gateway of the virtual private cloud 220 and resolve on-premises hosts 232 to virtual routing IP addresses, to which the traffic, such as requests, from virtual private cloud 220 may be routed via the virtual access point 224 to the connectivity agent 234. The connectivity agent 234 may be configured to perform a reverse lookup to find the mapped on-premises host 232 and relay the traffic to the identified host 232. This virtual IP based routing mechanism works on an IP level, making the solution adaptable and transparent to the software applications 222.

In some example embodiments, the control plane 210 is configured to manage the virtual zone. The control plane 210 may comprise an authentication management component 212, an access control component 214, a system mapping component 216, and a routing management component 218. The authentication management component 212 may be configured to manage discovery of the virtual access point 224 and the connectivity agent 234, such as detecting the installation of the virtual access point 224 on the virtual private cloud 220 and the installation of the connectivity agent 234 on the on-premises network 230, as well as digital certificate management for the virtual access point 224 and the connectivity agent 234. The virtual access point 224 and the connectivity agent 234 may be registered with the control plane 210 at startup after they are installed on the virtual private cloud 220 and the on-premises network 230, respectively. The virtual access point 224 and the connectivity agent 234 may request and be issued Transport Layer Security (TLS) client certificates signed by the control plane 210. Mutual TLS, a type of mutual authentication in which the two parties in a connection authenticate each other using the TLS protocol, may be enforced by the system architecture 200 to establish a secure data tunnel 240 between the virtual access point 224 and the connectivity agent 234.

The access control component 214 may be configured to provide fine grained firewall configuration so that every connection request from the virtual private cloud 220 is filtered in the connectivity agent 234 by rules. For example, the access control component 214 may send rules to the connectivity agent 234 for use in filtering requests based on one or more factors, such as destination host 232 for the request, authentication, software application 222 that issued the request, or some other factor. A user may configure the rules by accessing the access control component 214 via a computing device of the user and configuring the rules via communication with the access control component 214.

Figure 3:
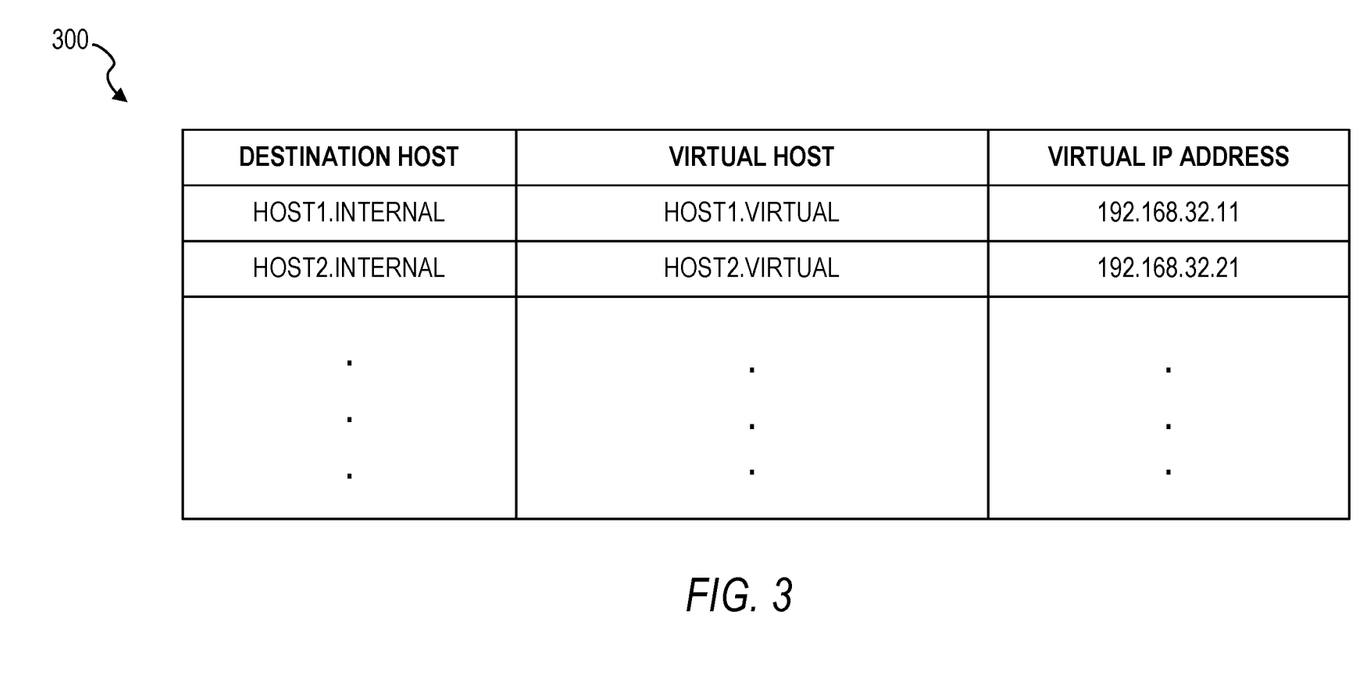
FIG. 3 illustrates an example mapping of associations between destination hosts, virtual host identifications, and virtual Internet Protocol (IP) addresses.

The system mapping component 216 may be configured to store a mapping of associations between a plurality of destination hosts 232, a plurality of virtual host identifications, and a plurality of virtual IP addresses. FIG. 3 illustrates an example mapping 300 (e.g., a routing table configuration) of associations between destination hosts 232 (e.g., host1.internal, host2.internal), virtual host identifications (e.g., host1.virtual, host2.virtual), and virtual IP addresses (e.g., 192.168.32.11, 192.168.32.21). The virtual access point 224 may scan the mapping 300 to convert a virtual host identification, which may be received by the virtual access point 224 via a request from the software application 222, to a virtual IP address. The connectivity agent 234 may scan the mapping 300 to determine the on-premises destination host 232 corresponding to the virtual IP address, thereby identifying the appropriate destination host 232 to which to relay traffic originating from the software application 222 and relayed by the virtual access point 224. The software applications 222 may establish connections to virtual hosts that correspond to virtual IP addresses resolved by the virtual access point 224 acting as a domain name system (DNS) server. Then, IP packets that are sent by the software applications 222 to the virtual IP addresses may be routed to the virtual access point 224, where they may be forwarded to the connectivity agent 234. The connectivity agent 234 may convert the virtual IP addresses into destination hosts 232 by scanning the mapping 300, which may be stored in-memory, and relay connections to the destination hosts 232.

The mapping 300 may be configured and maintained in the control plane 210. In some example embodiments, the mapping 300 may be synced to the virtual access point 224 and the connectivity agent 234 automatically in response to an event occurring within the system architecture 200. For example, the mapping 300 may be automatically synced to the virtual access point 224 and the connectivity agent 234 in response to installation of the virtual access point 224 and the connectivity agent 234 on the virtual private cloud 220 and on the on-premises network 230, respectively. Additionally or alternatively, the mapping 300 may be automatically synced to the virtual access point 224 and the connectivity agent 234 in response to registration of the virtual access point 224 and the connectivity agent 234 with the control plane 210. The automatic syncing of the mapping 300 to the virtual access point 224 and the connectivity agent 234 may also be triggered in response to a change in the configuration of the hosts 232 in the on-premises network 230, such as the removal of one of the hosts 232 from the on-premises network 230, the addition of a host 232 to the on-premises network 230, or a change in a hostname or network address of one of the hosts 232 on the on-premises network 230. The routing management component 218 may be configured to manage the mapping 300 and sync it to the virtual access point 224 and the connectivity agent 234 to have their local routing table properly configured.

In some example embodiments, the virtual access point 224 may be deployed into the virtual private cloud 220 and associated with a public IP address to which an encrypted data tunnel 240 is established from the on-premises network 230. Once the data tunnel 240 is established, the virtual access point 224 may set up a tun device with a virtual IP address and the mapping 300 (e.g., the local routing table) based on the configuration synced from the control plane 210. A tun device is a virtual point-to-point connection that works at layer three (the IP level) of the networking stack. The virtual private cloud's DNS server may be set to the virtual access point 224, where any virtual host identification submitted by the software applications 222 is resolved to the pre-assigned virtual IP address. According to the routing table of the mapping 300, traffic destined for the virtual IP address may be routed to the virtual access point 224 to be forwarded to the connectivity agent 234 via the secure data tunnel 240. The connectivity agent 234 may be configured to reassemble IP packets received from the software applications 222 via the secure data tunnel 240 and scan the mapping 300 to convert the virtual IP address included in each IP packet to the valid internal destination host 232 in on-premises network 230. After this destination conversion by the connectivity agent 234, the connectivity agent 234 may filter connections by checking an access control configuration and dialing the internal destination host 232. The response traffic from the destination host 232 may be disassembled into IP packets and forwarded to the virtual access point 224 via the secure data tunnel 240.

The connectivity agent 234 may deny a request to establish a connection between one of the software applications 222 and one of the destination hosts 232 or a request by the software application 222 to perform an action with respect to the destination host 232 (e.g., a request to retrieve or otherwise access data stored on the destination host 232). The connectivity agent 234 may deny such a request based on one or more access control rules. In addition to denying the request in such events, the connectivity agent 234 may store a record of the request denial in a database 236 of the on-premises network 230. The record of the request denial may include details of the request, such as the identification of the software application 222 that sent the request, what action was being requested by the software application 222, and the identification of the destination host 232 that was being targeted by the request, as well as the reason why the request was denied by the connectivity agent 234, such as the access control rule that was violated or otherwise not satisfied. The connectivity agent 234 may send or display a notification of the request denial to a user of the on-premises network 230, such as by sending a message to an e-mail account of the user or displaying the notification on a computing device of the user. The user of the on-premises network 230 may access the records of request denials stored in the database 236 via the computing device of the user in order to enable the user to learn about potential security threats to the destination host 232.

In some example embodiments, a sequence to establish the secure data tunnel 240 between the virtual access point 224 and the connectivity agent 234 may start with the virtual access point 224 and the connectivity agent 234 registering themselves in the control plane 210 for auto-discovery. The control plane 210 may then sync the mapping 300 to the virtual access point 224 and the connectivity agent 234 when any configuration of the mapping 300 is changed, such as by sending the mapping 300, authentication information, and routing information to the virtual access point 224 and the connectivity agent 234. Once the configuration that includes the public address of virtual access point 224 is synced to the connectivity agent 234, the connectivity agent 234 may initiate the open tunnel request to the virtual access point 224 and establish the secure data tunnel 240.

Figure 4:
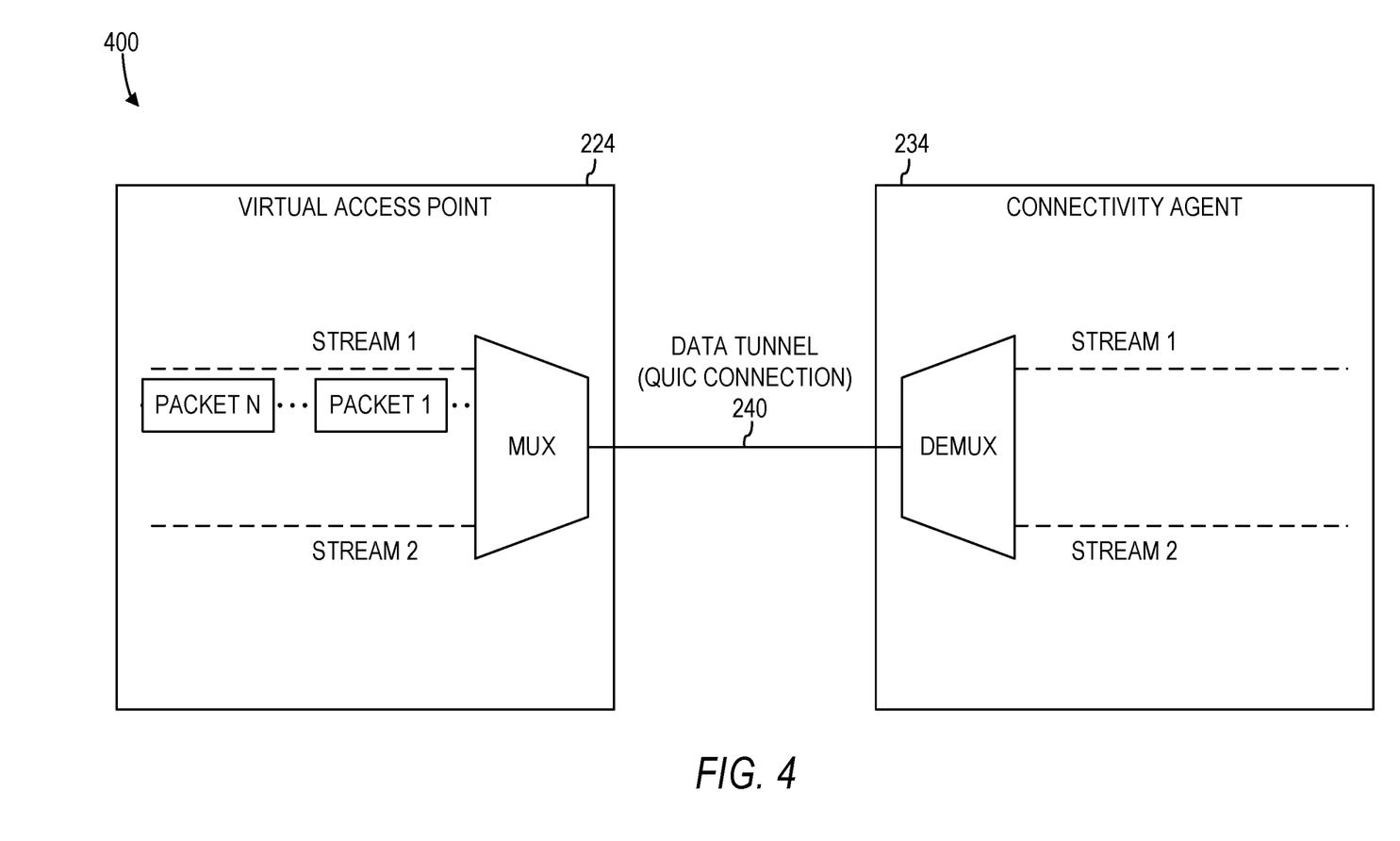
FIG. 4 illustrates an example data tunnel model.

FIG. 4 illustrates an example data tunnel model 400. A data tunnel is a method for transporting data across a network using protocols that are not supported by that network. Tunneling works by encapsulating packets, such as by wrapping packets inside of other packets. Packets are small pieces of data that can be reassembled at their destination into a larger file. In some example embodiments, the data tunnel model 400 uses a QUIC protocol as the underlying transportation with mutual TLS between the virtual access point 224 and the connectivity agent 234. IP packets belonging to a same tuple (e.g., source IP address, source port, target IP address, target port) may be encapsulated in a separate QUIC stream for reliable transportation. QUIC improves performance of connection-oriented web applications compared to those using TCP. QUIC achieves this improved performance by establishing a number of multiplexed connections between two endpoints using User Datagram Protocol (UDP).

The use of the QUIC protocol greatly reduces overhead during connection setup. As most Hypertext Transfer Protocol (HTTP) connections will demand TLS, QUIC makes the exchange of setup keys and supported protocols part of the initial handshake process. When a client opens a connection, the response packet includes the data needed for future packets to use encryption, which eliminates the need to set up the TCP connection and then negotiate the security protocol via additional packets. Other protocols can be serviced in the same way, combining together multiple steps into a single request-response. This data can then be used both for following requests in the initial setup, as well as future requests that would otherwise be negotiated as separate connections. Furthermore, each QUIC stream is separately flow-controlled and lost data is retransmitted at the level of QUIC, not UDP. As a result, if an error occurs in one stream, the protocol stack may continue servicing other streams independently.

The underlaying QUIC connection of the data tunnel 240 may always be kept open and auto-reconnected when there is network fluctuation. Packets may be cached in the sender when the underlaying connection is broken to make sure that the application-level connection will not be interrupted by network fluctuation, which happens frequently in cloud environments. The use of the QUIC protocol for the data tunnel 240 connecting the virtual private cloud 220 with the on-premises network 230 provides seamless auto-reconnect ability. Data pipelines running in the software applications 222 are not interrupted by underlying network fluctuations. As a result, the connectivity between the virtual private cloud 220 and the on-premises network 230 is resilient enough to tolerate network failures.

Figure 5:
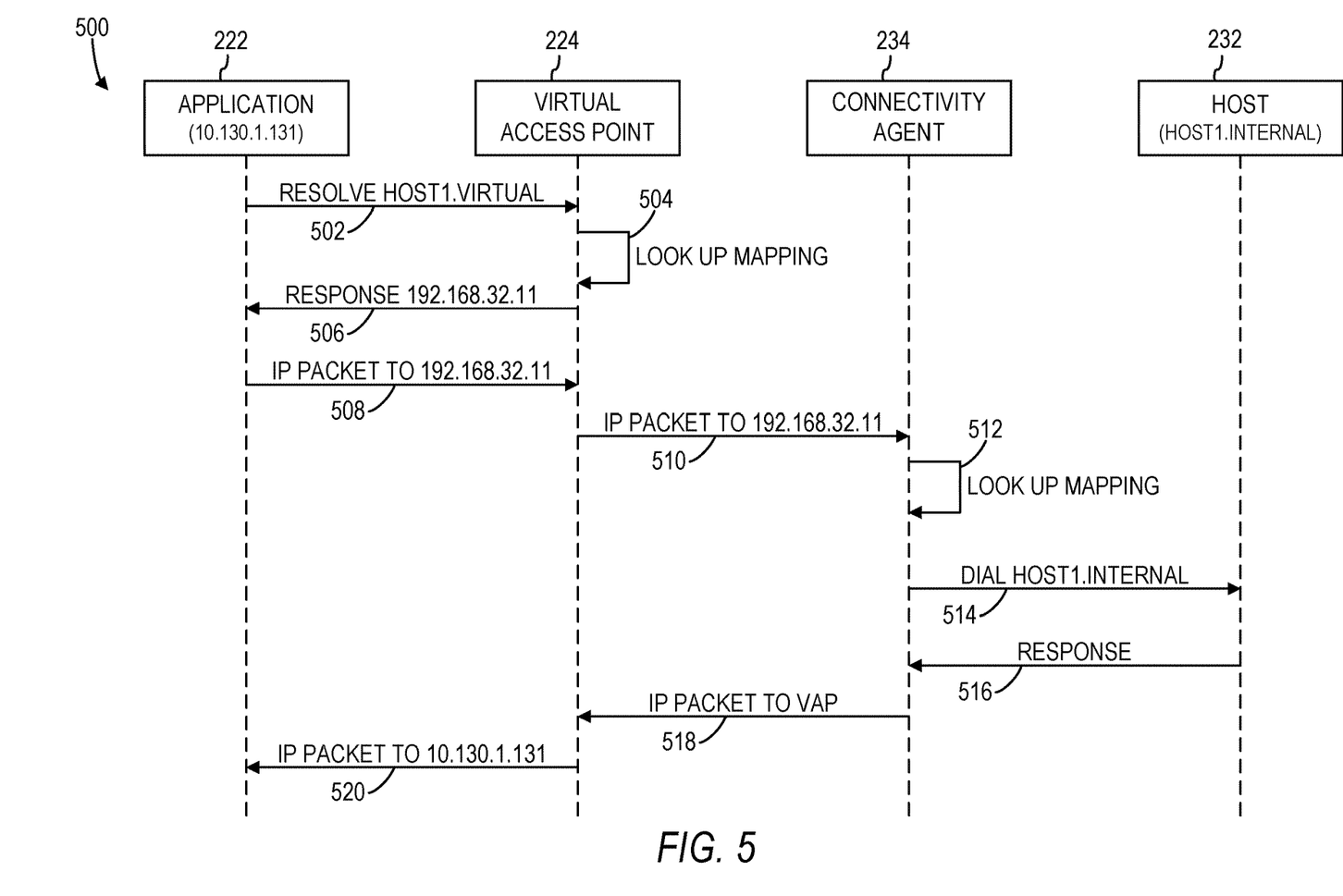
FIG. 5 illustrates an example connection sequence for providing connectivity between cloud and on-premises systems.

FIG. 5 illustrates an example connection sequence 500 for providing connectivity between cloud and on-premises systems. In the connection sequence 500, at step 502, when a software application 222 wants to communicate with a certain on-premises host 232, the software application 222 may send a request to resolve a virtual host identification of the host 232 to the virtual access point 224. The virtual access point 224 may then resolve the virtual host identification, at step 504, by looking it up in the mapping 300, thereby identifying a virtual IP address of the host 232 based on the virtual host identification. At step 506, the virtual access point 224 may send a response including the identified virtual IP address of the host 232 to the software application 222. Next, the software application 222 may attempt to establish a TCP/UDP connection to the destination, at step 508, and send an IP packet including the virtual IP address of the host 232 to the virtual access point 224 for forwarding to the connectivity agent 234. At step 510, the TCP/UDP payload may be disassembled into IP packets, which may be routed by the virtual access point 224 to the connectivity agent 234. The connectivity agent 234 may, at step 512 assemble the IP packets and convert the virtual IP address into the destination host 232 by looking up the virtual IP address in the mapping 300 to identify the destination host 232.

At step 514, the connectivity agent 234 may then establish a TCP/UDP connection to the destination host 232 and send the request submitted by the software application 222 to the destination host 232. The request may comprise a request to retrieve data stored by the destination host 232. Additionally or alternatively, the request may comprise a request to perform some other type of action on the destination host 232. At step 516, the destination host 232 may process the request and send a response to the request, such as requested data stored in the destination host 232, back to the connectivity agent 234. The connectivity agent 234 may disassemble the response from the destination host 232 into IP packets, which may be sent back to the virtual access point 224, at step 518, for reassembling and routing back to the software application 222, at step 520, by the virtual access point 224.

Figure 6:
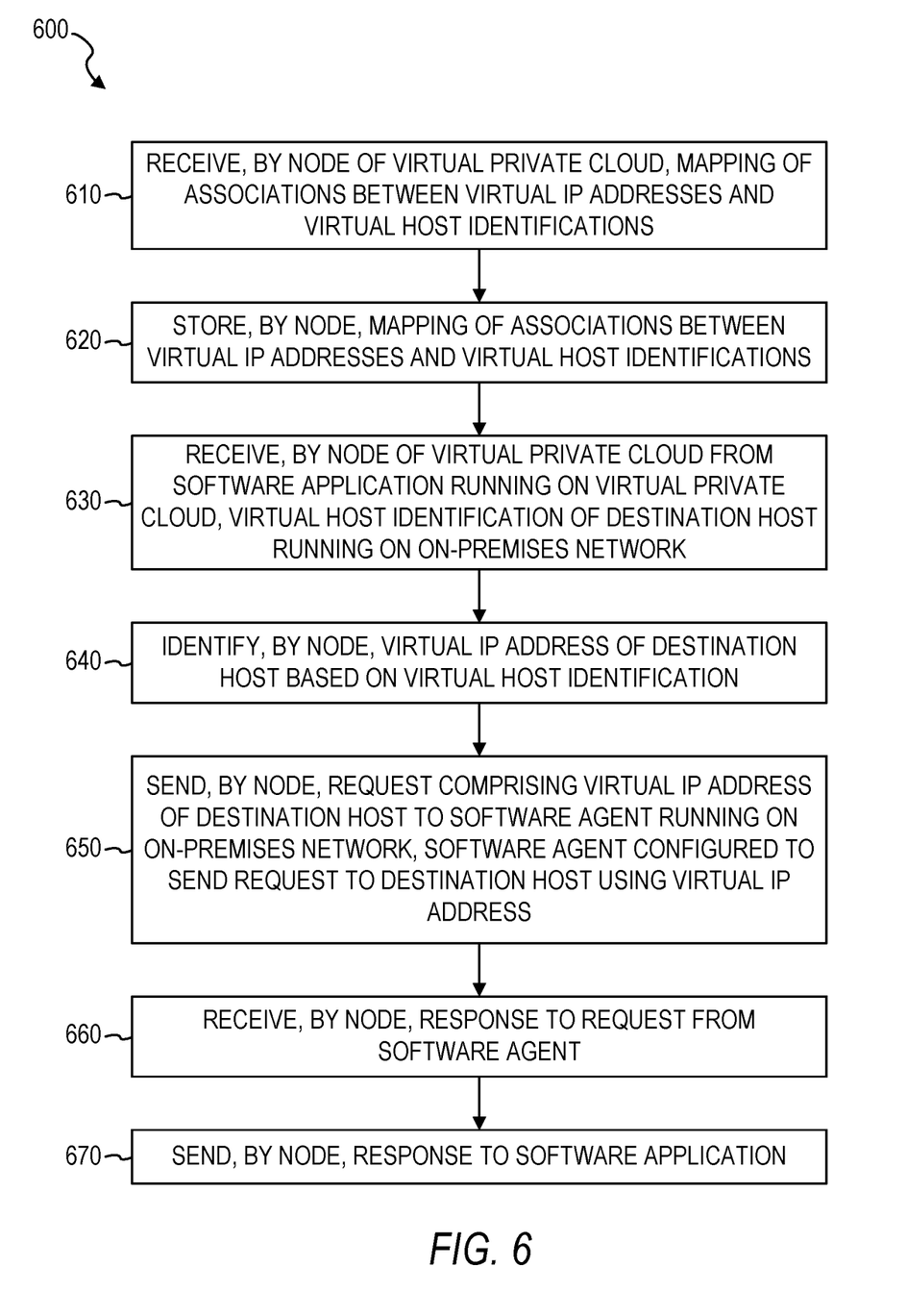
FIG. 6 is a flowchart illustrating an example method of providing connectivity between cloud and on-premises systems.

FIG. 6 is a flowchart illustrating an example method 600 of providing connectivity between cloud and on-premises systems. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by one or more components of the system architecture 200 of FIG. 2.

At operation 610, a node of a virtual private cloud 220, such as the virtual access point 224, may receive a mapping 300 of associations between a plurality of virtual IP addresses and a plurality of virtual host identifications from the control plane 210 of the virtual private cloud 220. The node may comprise a gateway of the virtual private cloud 220. However, other types and configurations of the node are also within the scope of the present disclosure. In some example embodiments, the control plane 210 may send the mapping 300 of associations between the plurality of virtual IP addresses and the plurality of virtual host identifications to the node, such as in response to the node and the connectivity agent 234 registering with the control plane 210 or in response to a change occurring with respect to one or more destination hosts 232 running on the on-premises network 230. The control plane 210 may also be configured to send a mapping 300 of associations between the plurality of virtual IP addresses and a plurality of destination hosts 232 to a software agent, such as the connectivity agent 234, running on the on-premises network 230. The mapping 300 of associations between the plurality of virtual IP addresses and the plurality of destination hosts 232 may be included in a larger mapping that also includes the mapping 300 of associations between the plurality of virtual IP addresses and the plurality of virtual host identifications, such as shown in FIG. 3. In some example embodiments, one or more of the plurality of destination hosts 232 comprises an application server. However, other types of destination hosts 232 are also within the scope of the present disclosure.

Next, the node may store the mapping 300 of associations between the plurality of virtual IP addresses and the plurality of virtual host identifications, at operation 620. For example, the node may store the mapping 300 in an in-memory data storage of the node, such as in an in-memory database of the node. However, the mapping 300 may be stored by the node in other ways as well.

The node may subsequently, at operation 630, may receive a virtual host identification of a destination host 232 running on the on-premises network 230 from a software application 222 running on the virtual private cloud 220. The virtual host identification may be received as part of a request to resolve the virtual host identification. However, the virtual host identification may be received in other ways as well.

Then, at operation 640, the node may identify a virtual Internet Protocol (IP) address of the destination host 232 based on the virtual host identification. The identifying of the virtual IP address of the destination host 232 may comprise using the virtual host identification to identify the virtual IP address from the mapping 300 of associations between the plurality of virtual IP addresses and the plurality of virtual host identifications. For example, the node may scan the mapping 300 stored on the virtual private cloud 220 (e.g., by the virtual access point 224) to find the virtual host identification, and then determine the virtual IP address that maps to the virtual host identification.

At operation 650, the node may send a request comprising the virtual IP address of the destination host 232 to a software agent, such as the connectivity agent 234, running on the on-premises network 230. In addition to including the virtual IP address of the destination host 232, the request may also comprise a request to perform an action with respect to the destination host 232, such as a request to retrieve data from the destination host 232. In some example embodiments, the software agent may be configured to send the request to the destination host 232 using the virtual IP address. For example, the software agent may be configured to send the request to the destination host 232 using the virtual IP address to identify the destination host 232 from the mapping 300 of associations between the plurality of virtual IP addresses and the plurality of destination hosts that is stored on the on-premises network 230 (e.g., by the connectivity agent 234). In some example embodiment, the node may send the request to the software agent by transmitting the request to the software agent using a Quick User Datagram Protocol (UDP) Internet Connection (QUIC) protocol, as previously discussed. However, other communication protocols are also within the scope of the present disclosure.

Subsequently, the node may, at operation 660, receive a response to the request from the software agent. For example, the node may receive data that was requested by the software application 222 to be retrieved from the destination host 232. Other types of responses are also within the scope of the present disclosure.

At operation 670, the node may then send the response to the software application 222 from which the request to the destination host 232 was originally sent. In some example embodiments, the node may reassemble disassembled data packets of the response, and then send the reassembled data packets to the software application.

It is contemplated that any of the other features described within the present disclosure can be incorporated into the method 600.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving, by a node of a virtual private cloud from a software application running on the virtual private cloud, a virtual host identification of a destination host running on an on-premises network; identifying, by the node, a virtual Internet Protocol (IP) address of the destination host based on the virtual host identification; and sending, by the node, a request comprising the virtual IP address of the destination host to a software agent running on the on-premises network, the software agent being configured to send the request to the destination host using the virtual IP address.

Example 2 includes the computer-implemented method of example 1, wherein the node comprises a gateway of the virtual private cloud.

Example 3 includes the computer-implemented method of example 1 or example 2, wherein the destination host comprises an application server.

Example 4 includes the computer-implemented method of any one of examples 1 to 3, wherein the identifying the virtual IP address of the destination host comprises using the virtual host identification to identify the virtual IP address from a mapping of associations between a plurality of virtual IP addresses and a plurality of virtual host identifications, the mapping being stored by the virtual private cloud.

Example 5 includes the computer-implemented method of any one of examples 1 to 4, further comprising: receiving, by the node, the mapping of associations between the plurality of virtual IP addresses and the plurality of virtual host identifications from a control plane of the virtual private cloud; and storing, by the node, the mapping of associations between the plurality of virtual IP addresses and the plurality of virtual host identifications.

Example 6 includes the computer-implemented method of any one of examples 1 to 5, further comprising: sending, by control plane, the mapping of associations between the plurality of virtual IP addresses and the plurality of virtual host identifications to the node.

Example 7 includes the computer-implemented method of any one of examples 1 to 6, further comprising: sending, by the control plane, a mapping of associations between the plurality of virtual IP addresses and a plurality of destination hosts to the software agent, the software agent being further configured to send the request to the destination host using the virtual IP address to identify the destination host from the mapping of associations between the plurality of virtual IP addresses and the plurality of destination hosts.

Example 8 includes the computer-implemented method of any one of examples 1 to 7, wherein the sending the request to the software agent comprises transmitting the request to the software agent using a Quick User Datagram Protocol (UDP) Internet Connection (QUIC) protocol.

Example 9 includes the computer-implemented method of any one of examples 1 to 8, further comprising: receiving, by the node, a response to the request from the software agent; and sending, by the node, the response to the software application.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 7:
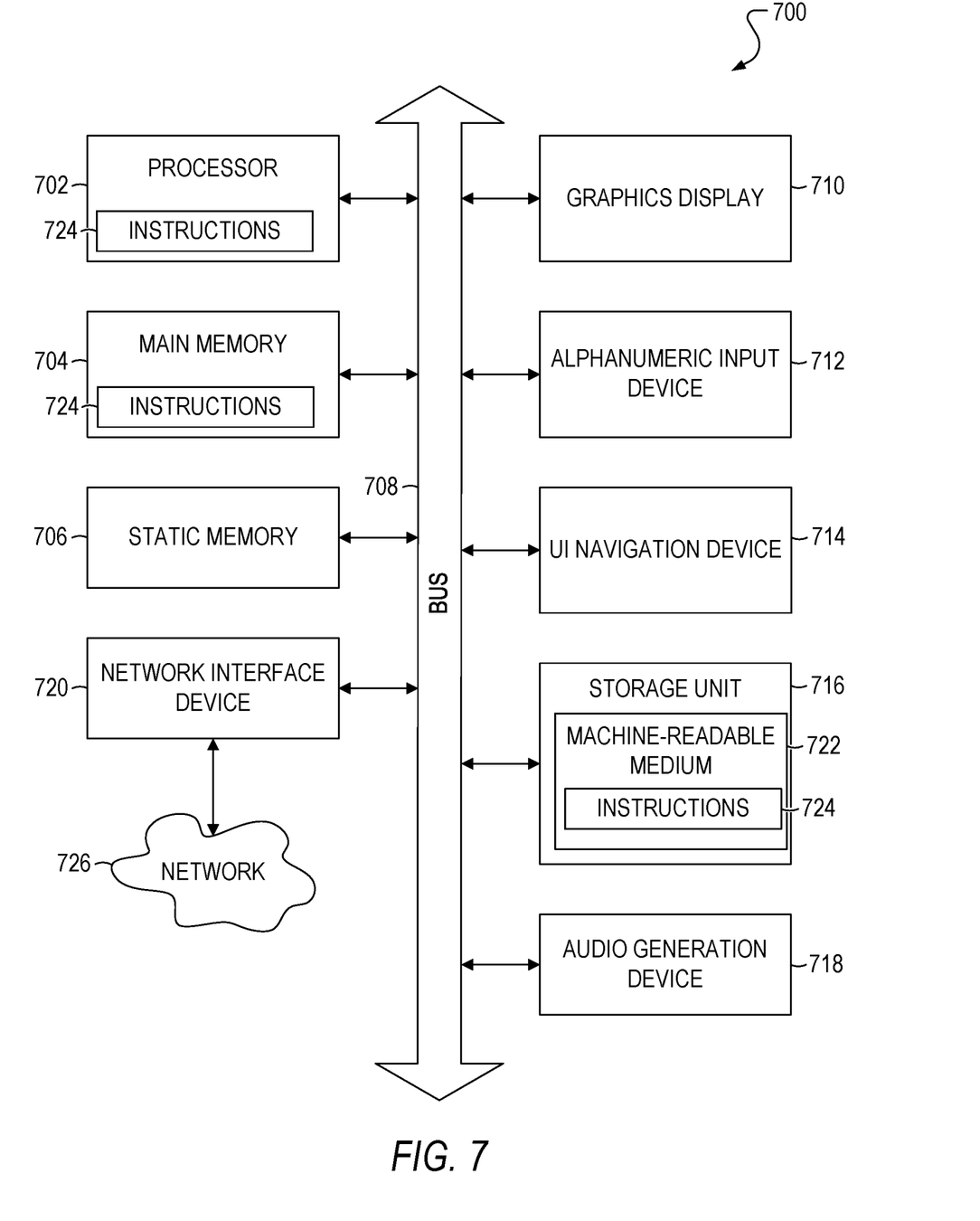
FIG. 7 is a block diagram of an example computer system on which methodologies described herein can be executed.

FIG. 7 is a block diagram of a machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   receiving, by a node of a virtual private cloud from a software application running on the virtual private cloud, a virtual host identification of a destination host running on an on-premises network;
   identifying, by the node, a virtual Internet Protocol (IP) address of the destination host based on the virtual host identification, using a first copy of a mapping, the first copy stored at the node, the mapping containing associations among a plurality of destination hosts, a plurality of virtual host identifications, and a plurality of virtual IP addresses; and
   sending, by the node, a request comprising the virtual IP address of the destination host to a software agent running on the on-premises network, the software agent being configured to access a second copy of the mapping stored at the on-premises network to identify an actual IP address of the destination host and to send the request to the destination host using the identified actual IP address, the second copy being an exact copy of the first copy.

2. The computer-implemented method of claim 1, wherein the node comprises a gateway of the virtual private cloud.

3. The computer-implemented method of claim 1, wherein the destination host comprises an application server.

4. The computer-implemented method of claim 1, further comprising:
   receiving, by the node, the mapping from a control plane of the virtual private cloud; and
   storing, by the node, the mapping.

5. The computer-implemented method of claim 4, further comprising:
sending, by control plane, the mapping to the node.

6. The computer-implemented method of claim 5, further comprising:
sending, by the control plane, the mapping to the software agent.

7. The computer-implemented method of claim 1, wherein the sending the request to the software agent comprises transmitting the request to the software agent using a Quick User Datagram Protocol (UDP) Internet Connection (QUIC) protocol.

8. The computer-implemented method of claim 1, further comprising:
receiving, by the node, a response to the request from the software agent; and
sending, by the node, the response to the software application.

9. A system of comprising:
at least one hardware processor; and
a non-transitory computer-readable medium storing executable instructions that, when executed, cause the at least one hardware processor to perform computer operations comprising:
receiving, by a node of a virtual private cloud from a software application running on the virtual private cloud, a virtual host identification of a destination host running on an on-premises network;
identifying, by the node, a virtual Internet Protocol (IP) address of the destination host based on the virtual host identification, using a first copy of a mapping, the first copy stored at the node, the mapping containing associations among a plurality of destination hosts, a plurality of virtual host identifications, and a plurality of virtual IP addresses; and
sending, by the node, a request comprising the virtual IP address of the destination host to a software agent running on the on-premises network, the software agent being configured to access a second copy of the mapping stored at the on-premises network to identify an actual IP address of the destination host and to send the request to the destination host using the identified actual IP address, the second copy being an exact copy of the first copy.

10. The system of claim 9, wherein the node comprises a gateway of the virtual private cloud.

11. The system of claim 9, wherein the destination host comprises an application server.

12. The system of claim 9, wherein the computer operations further comprise:
receiving, by the node, the mapping from a control plane of the virtual private cloud; and
storing, by the node, the mapping.

13. The system of claim 12, wherein the computer operations further comprise:
sending, by control plane, the mapping to the node.

14. The system of claim 13, wherein the computer operations further comprise:
sending, by the control plane, the mapping to the software agent.

15. The system of claim 9, wherein the sending the request to the software agent comprises transmitting the request to the software agent using a Quick User Datagram Protocol (UDP) Internet Connection (QUIC) protocol.

16. The system of claim 9, wherein the computer operations further comprise:
receiving, by the node, a response to the request from the software agent; and
sending, by the node, the response to the software application.

17. A non-transitory machine-readable storage medium tangibly embodying a set of instructions that, when executed by at least one hardware processor, causes the at least one processor to perform computer operations comprising:
receiving, by a node of a virtual private cloud from a software application running on the virtual private cloud, a virtual host identification of a destination host running on an on-premises network;
identifying, by the node, a virtual Internet Protocol (IP) address of the destination host based on the virtual host identification, using a first copy of a mapping, the first copy stored at the node, the mapping containing associations among a plurality of destination hosts, a plurality of virtual host identifications, and a plurality of virtual IP addresses; and
sending, by the node, a request comprising the virtual IP address of the destination host to a software agent running on the on-premises network, the software agent being configured to access a second copy of the mapping stored at the on-premises network to identify an actual IP address of the destination host and to send the request to the destination host using the identified actual IP address, the second copy being an exact copy of the first copy.

18. The non-transitory machine-readable storage medium of claim 17, wherein the node comprises a gateway of the virtual private cloud.

* * * * *